US012208610B2

(12) United States Patent
Liao et al.

(10) Patent No.: US 12,208,610 B2
(45) Date of Patent: Jan. 28, 2025

(54) INPUT ASSEMBLIES FOR MEDIA PROCESSING APPARATUS

(71) Applicant: ZEBRA TECHNOLOGIES CORPORATION, Lincolnshire, IL (US)

(72) Inventors: Huanhua Liao, Guanghzou (CN); QiMing Feng, Guangzhou (CN); Yong Liu, Guangzhou (CN); Zhong Gui Wang, Guangzhou (CN)

(73) Assignee: Zebra Technologies Corporation, Lincolnshire, IL (US)

( * ) Notice: Subject to any disclaimer, the term of this patent is extended or adjusted under 35 U.S.C. 154(b) by 270 days.

(21) Appl. No.: 17/679,273

(22) Filed: Feb. 24, 2022

(65) Prior Publication Data

US 2023/0264496 A1 Aug. 24, 2023

(51) Int. Cl.
*B41J 15/02* (2006.01)

(52) U.S. Cl.
CPC .................................... *B41J 15/02* (2013.01)

(58) Field of Classification Search
CPC . B41J 15/02; B41J 33/003; B41J 13/00; B41J 13/0009; B41J 15/00; B41J 15/04; B41J 15/044; B41J 15/046
See application file for complete search history.

(56) References Cited

FOREIGN PATENT DOCUMENTS

JP 2017503684 * 2/2017 ............. B41J 35/28

* cited by examiner

*Primary Examiner* — Kristal Feggins

(57) ABSTRACT

A media processing apparatus includes: a base defining (i) a chamber configured to receive a media supply, and (ii) a lower portion of a media outlet; a ribbon positioning assembly coupled to the base, the ribbon positioning assembly configured to support a print head at an upper portion of the media outlet; an input assembly affixed to the ribbon positioning assembly, the input assembly including an input device activatable to generate a signal to a controller of the media processing apparatus; a lid coupled to the base, and movable relative to the base between (i) a closed position to enclose the chamber and the ribbon positioning assembly, and (ii) an open position to expose the chamber for access from an exterior of the media processing apparatus; the lid including an opening configured to align with the input device when the lid is in the closed position.

15 Claims, 6 Drawing Sheets

INPUT ASSEMBLIES FOR MEDIA PROCESSING APPARATUS

BACKGROUND

Media processing apparatus, such as desktop thermal transfer label printers, may include a variety of components to supplement printing of labels or other media. Examples of such components include input devices to control the operation of the apparatus, sensors to monitor a supply of pigment-carrying ribbon (e.g., to detect when the ribbon is exhausted), and the like. The provision of such components may complicate the manufacture and assembly of the printers.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
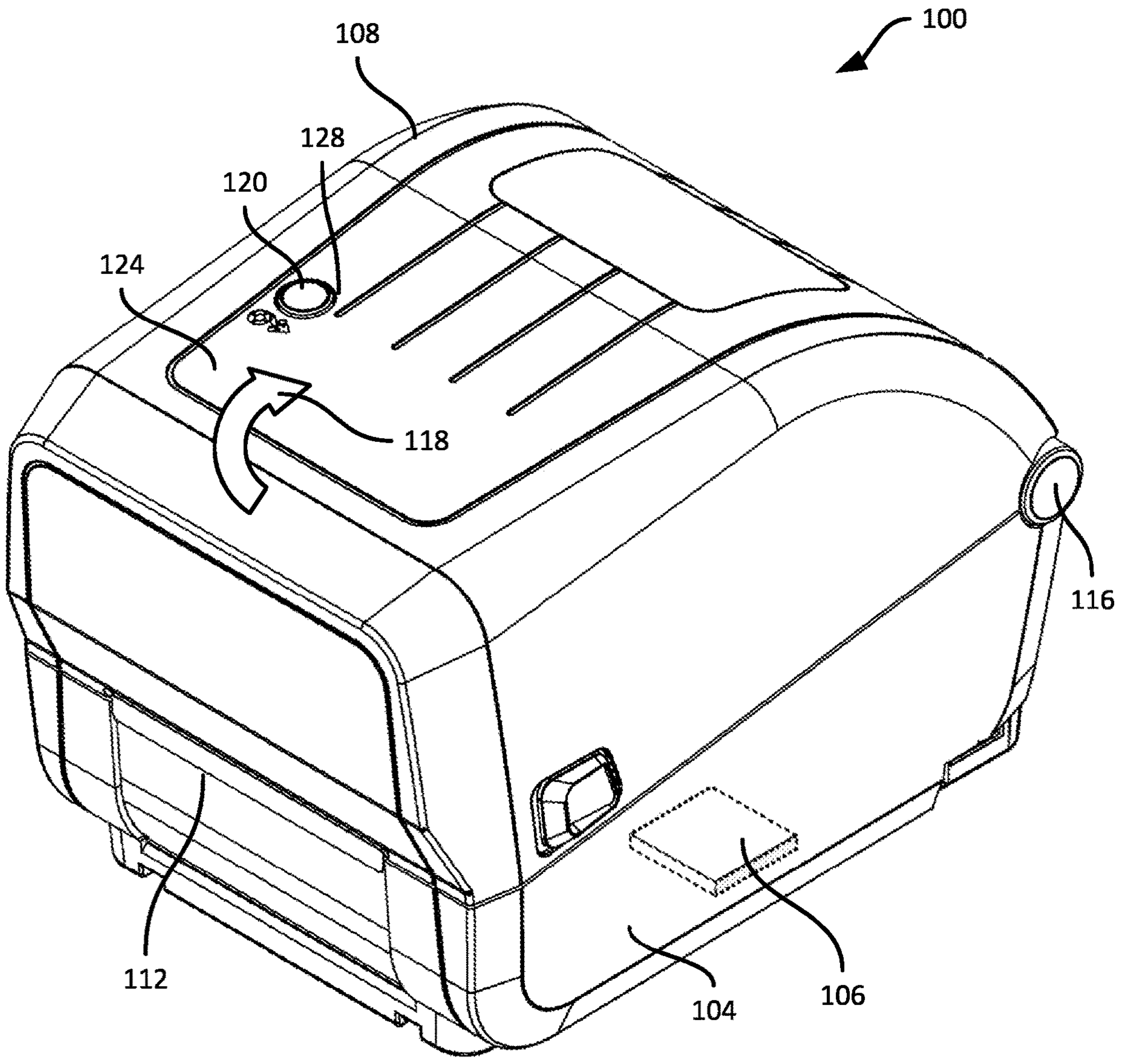
FIG. 1 is a diagram of a media processing apparatus.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a media processing apparatus, comprising: a base defining (i) a chamber configured to receive a media supply, and (ii) a lower portion of a media outlet; a ribbon positioning assembly coupled to the base, the ribbon positioning assembly configured to support a print head at an upper portion of the media outlet; an input assembly affixed to the ribbon positioning assembly, the input assembly including an input device activatable to generate a signal to a controller of the media processing apparatus; a lid coupled to the base, and movable relative to the base between (i) a closed position to enclose the chamber and the ribbon positioning assembly, and (ii) an open position to expose the chamber for access from an exterior of the media processing apparatus; the lid including an opening configured to align with the input device when the lid is in the closed position.

Additional examples disclosed herein are directed to a ribbon spindle for a media processing apparatus, the ribbon spindle comprising: a rotatable body having an inner side and an outer side; a set of encoder teeth extending from the outer side, the encoder teeth detectable by a sensor of the media processing apparatus; a hub extending from the inner side, to support a ribbon supply of the media processing apparatus; and a friction member on the outer side, to engage with a ribbon tension setting mechanism of the media processing device.

Further examples disclosed herein are directed to an input assembly for a media processing apparatus, the input assembly comprising: a support member having an upper surface and a lower surface; an input device mounted on the upper surface and configured to align with an opening in a lid of the media processing apparatus; an optical sensor mounted on the lower surface and configured to detect rotation of an encoder wheel of the media processing apparatus; and a connector mounted on one of the upper surface and the lower surface, the connector being electrically coupled with each of the input device and the optical sensor.

FIG. 1 illustrates a media processing apparatus 100, such as a printer. The apparatus 100 in this example is a thermal transfer printer, in which pigment is transferred from a pigment-carrying ribbon onto media (e.g., labels, paper, or the like) at a nip formed by a print head and a platen roller. The print head, for example, can include a set of controllable thermal elements, e.g. a linear array of such elements extending across a media path. The platen roller can pull media from a media supply (e.g., a roll of paper, labels, or the like) disposed in a media chamber, along the media path, towards the above-mentioned nip. A pigment-carrying ribbon also traverses the nip together with the media (e.g., in contact with the media). The ribbon, for example, can travel along a ribbon path from a ribbon supply (e.g. a rotatable spool), to the print head, and then to a take-up spool.

As the media and the ribbon traverse the nip formed by the platen roller and the print head, the above-mentioned thermal elements are controlled to heat specific portions along the media path. Under the effect of heat generated by the thermal elements, and the pressure exerted by the nip, pigment carried on the ribbon can be transferred to the media, resulting in the impression of indicia on the media. The media then exits the apparatus 100.

As illustrated in FIG. 1, the media supply, ribbon supply and take-up spools, print head, and platen roller, as well as various other components of the apparatus 100, are enclosed within a housing of the apparatus 100, defined by a base 104 and a cover 108, which is also referred to as a lid 108. The base 104 houses a controller 106 of the apparatus 100, and defines an internal media chamber as noted above, to receive and support the media supply. The base 104 also defines a lower portion of a media outlet 112, from which processed media exits the apparatus 100. An upper portion of the media outlet 112 is defined by the cover 108, as will be apparent from FIG. 1. The cover 108 is movable relative to the base 104, e.g., by rotation relative to the base about an axis of rotation defined by a hinge 116 at a back of the apparatus 100 (e.g., an end of the apparatus 100 opposite the outlet 112). The cover 108 is rotatable between a closed position, shown in FIG. 1, and an open position (by rotation of the cover 108 in an arc 118) to expose the above-mentioned media chamber for access from an exterior of the apparatus 100.

The apparatus 100 also includes an input device 120, which may be referred to as a feed button (but need not specifically be a button, as will be discussed below), accessible to an operator of the apparatus 100 when the apparatus 100 is in an active configuration, with the cover 108 closed as shown in FIG. 1. The input device 120 can perform various control functions associated with the apparatus 100. For example, pressing or otherwise activating the input device 120 can initiate processing of media (e.g. by advancing a media roll). In other examples, activating the input device 120 (e.g., pressing for certain periods of time) can switch the apparatus 100 between distinct operational modes.

The input device 120 is accessible from an upper surface 124 of the cover 108. However, physically mounting the input device 120 to the cover 108 may complicate the manufacture and assembly of the apparatus 100, increase the cost of manufacture of the apparatus 100, or both. The input device 120 is electrically coupled with a controller of the apparatus 100, e.g., housed in the base 104. Further, as noted above, the cover 108 is movable. Still further, as will be apparent in the discussion below, the apparatus 100 includes various additional internal components within the cover 108. Affixing the input device 120 and associated components (such as a printed circuit board (PCB) carrying the input device 120) to the cover 108 and routing cabling or other signal conduits from the input device 120 to the controller may therefore be a complex, multi-step assembly process. Further, such a process may involve installing the input device 120 onto the cover 108 before the cover 108 is connected to the base 104, further complicating assembly (e.g., by requiring additional length in the signal conduits to account for the distance between the cover 108 and the base 104 when the conduits are connected to the controller).

In addition to the difficulties noted above, affixing the input device 120 to the cover 108 may also involve the installation of a separate plate, e.g., into an opening defined in the cover 108. Such a plate may carry the above-mentioned PCB and/or other components associated with the input device 120. Implementing such a plate, however, increases the number of parts used to assemble the apparatus 100, and may therefore further complicate assembly.

To simplify the manufacture and/or assembly of the apparatus 100, the input device 120 in the apparatus 100 as illustrated is therefore not affixed to the cover 108 itself. Instead, an input assembly that includes the input device 120 is supported on an internal component of the apparatus 100, and the cover 108 includes an opening 128 in the surface 124 that aligns with the input device 120 when the cover 108 is in the closed position.

Figure 2:
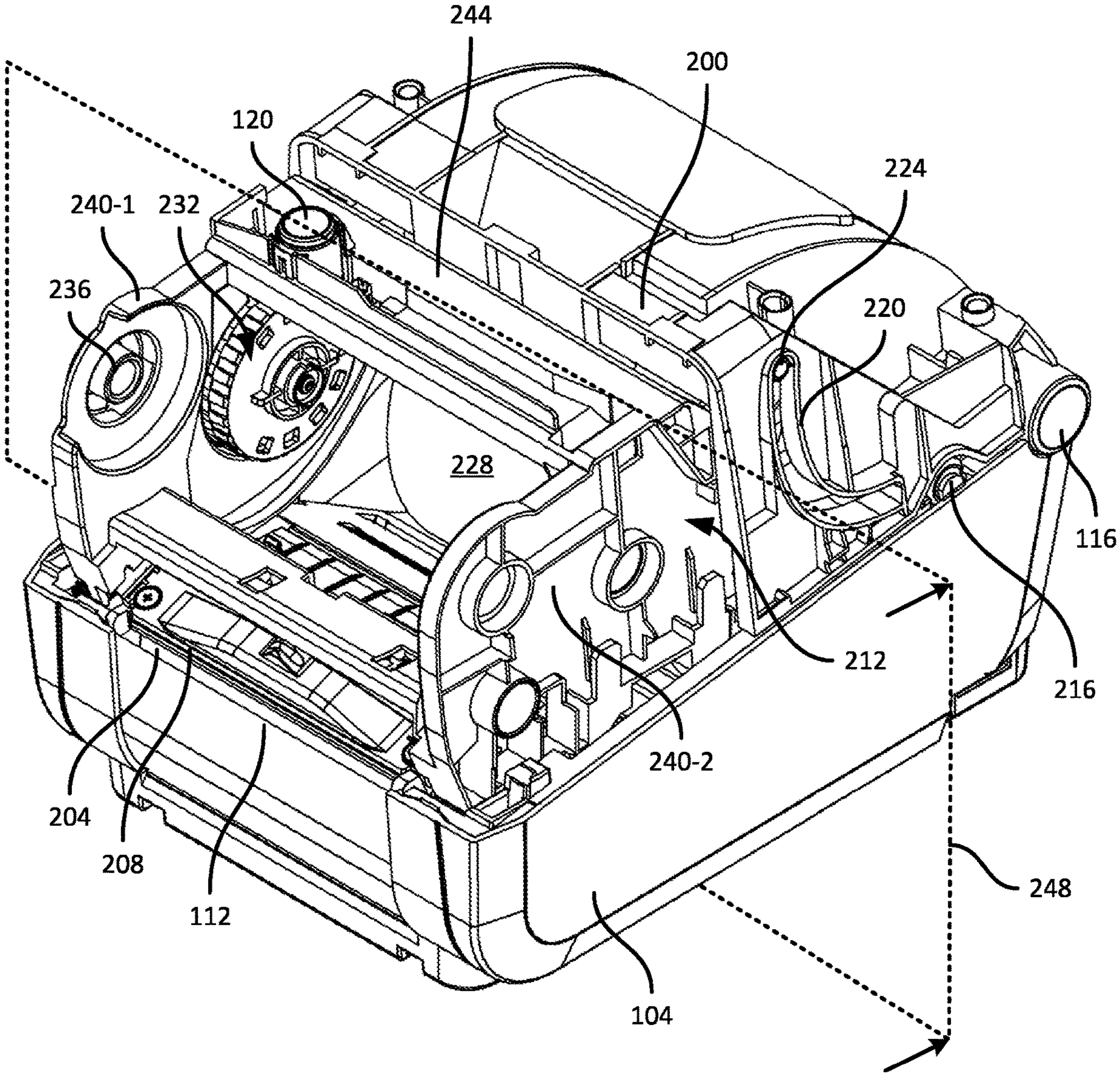
FIG. 2 is a diagram of the media processing apparatus of FIG. 1, with a cover thereof omitted.

Turning to FIG. 2, the apparatus 100 is shown with the cover 108 removed. As seen in FIG. 2, the cover 108 is affixed (e.g., substantially immovably) to a cover support 200 that is rotatably coupled to the base 104 at the hinge 116. Also visible with the removal of the cover 108 are a platen roller 204 supported within the base 104, and a print head 208 forming the above-mentioned nip with the platen roller 204. The print head 208 is supported by a frame 212 coupled to the base 104. In the present example, the frame 212 is also movable relative to the base 104, via a joint 216. As will be apparent, the joint 216 is closer to the forward end of the apparatus 100 (i.e., the end having the outlet 112), and the frame 212 therefore does not open along the same path as the cover 108. The movement of the frame 212 may, however, be driven by movement of the cover 108. In particular, the cover support 200 can include a curved track 220, and the frame 212 can include a pin 224 configured to engage with the track 220. As a result, manipulating the cover 108 to open the cover 108 also rotates the cover support 200 about the hinge 116, and during such rotation the track 220 pulls the pin 224 (and therefore the frame 212 as a whole) along a similar arc to the cover 108.

Opening the cover 108 and the frame 212 enables access to the above-mentioned media chamber, containing a media supply 228 in this example. Opening the cover 108 and the frame 212 also enables access to ribbon supply and take-up spools (omitted in FIG. 2 for visibility of other components of the apparatus 100). The ribbon supply spool, when present, is supported on a ribbon spindle 232 supported on the frame 212. Certain features of the spindle 232 will be discussed further below. The ribbon take-up spool, when present, is supported on a take-up spindle 236 also supported on the frame 212. The frame 212 is therefore also referred to as a ribbon positioning assembly 212.

As will be apparent from FIG. 2, the frame 212 includes side walls 240-1 and 240-2, joined by a cross-bar 244 which forms the upper-most portion of the frame 212 in the operational position illustrated. The input assembly including the input device 120 is supported by the cross-bar 244 of the frame 212, such that the input device 120 is placed in alignment with the opening 128 in the cover 108, when the cover 108 is closed.

Figure 3:
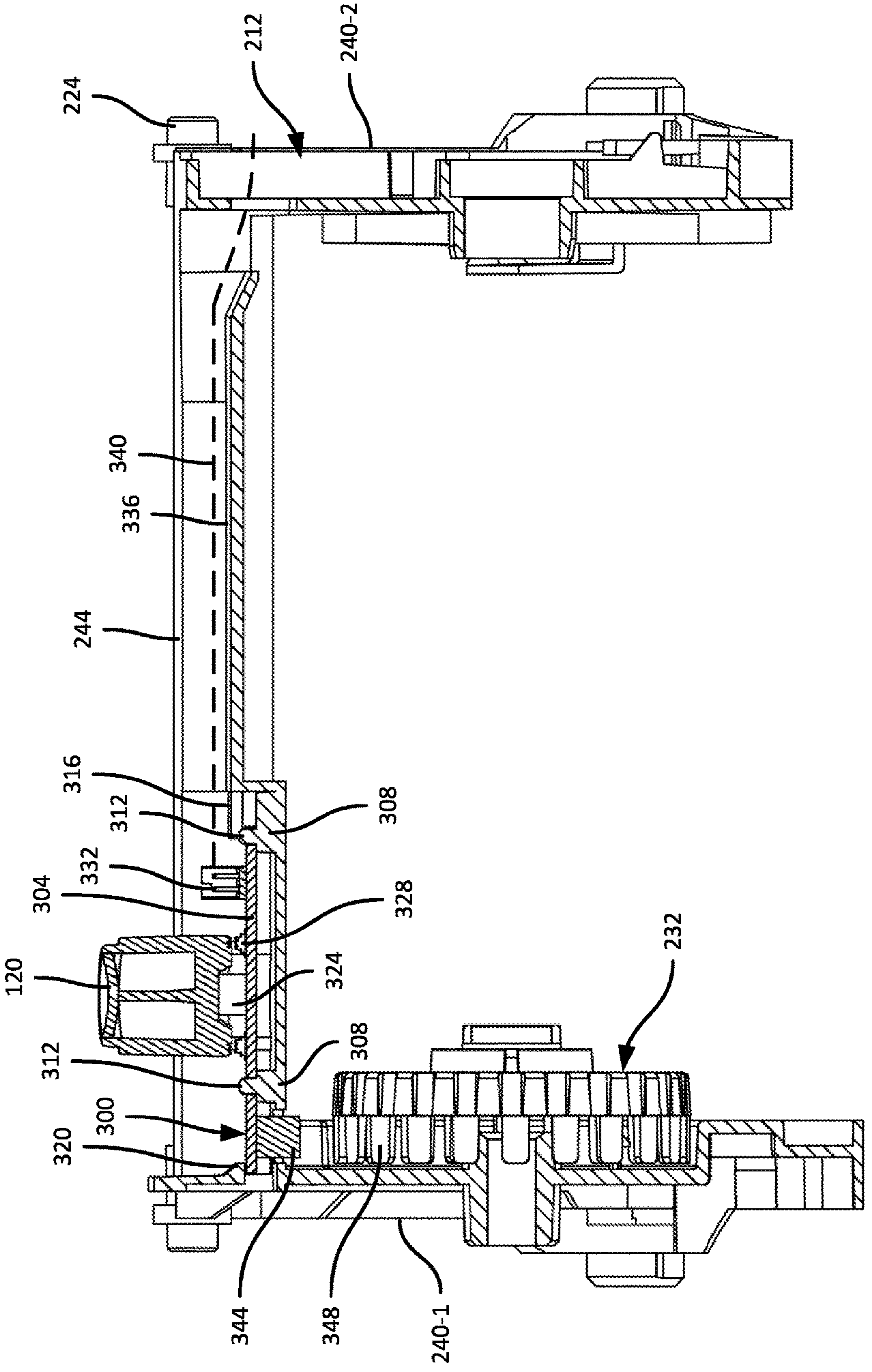
FIG. 3 is a cross section of certain components of the media processing apparatus of FIG. 2.

FIG. 3 illustrates a cross-sectional view of the frame 212 in isolation, taken at the plane 248 illustrated in FIG. 2, to further illustrate an input assembly 300 including the input device 120 and the mechanism by which the input assembly 300 is mounted to the frame 212. In particular, the input assembly 300 includes a support member 304, such as a PCB, supported by the cross-bar 244 of the frame 212. The support member 304, in this example, is supported on one or more protrusions 308 such as ledges or the like, defined on an upwards-facing surface of the cross-bar 244. The protrusions 308 can include locating pins 312 configured to extend through openings in the support member 304, to facilitate correct placement of the support member 304 on the cross-bar 244. The support member 304 can be affixed to the cross-bar 244 by fasteners such as screws, adhesives, or the like. In the present example, however, the support member 304 is assembled with the frame 212 in a toolless manner, e.g., by inserting a first edge of the support member 304 under a retaining member such as a lip 316 of the cross-bar 244, and pressing an opposite second edge of the support member 304 underneath a resilient tab 320 of the cross-bar 244.

The input device 120, in the illustrated example, includes a button, mounted over a switch 324 on an upper surface of the support member 304. The input device 120 need not be a button. In other examples, the input device 120 can include a touch-sensitive input, a switch (e.g., that can be toggled between two positions), a dial, or the like. The input assembly 300 can also include one or more light emitters 328, such as light-emitting diodes (LEDs) mounted on the upper surface of the support member 304. The button can include a translucent barrel or the like, through which light from the emitters 328 can travel for visibility at the upper surface of the button 120.

The input assembly 300 also includes a connector 332 mounted on the support member 304 (in this case, on the upper surface, although in other examples the connector 332 can be mounted on the lower surface of the support member 304). The support member 304 includes circuit traces or the like connecting the input device 120 (e.g., the switch 324) with the connector 332. The connector 332 is configured to engage with a signal conductor, such as a cable, wire, or the like, to couple the connector 332 with the controller 106. Activation of the input device 120, in other words, causes the transmission of a signal to the controller 106. The conductor can travel from the connector 332 through a channel 336 defined along a width of the cross-bar 244, e.g., along a conductor path 340 shown in dashed lines in FIG. 3.

In some examples, as illustrated in FIG. 3, the input assembly 300 also includes a sensor 344, such as an optical sensor (e.g., including an emitter such as an LED and a detector such as a photodiode). In this example, the sensor 344 is mounted on a lower surface of the support member 304, opposite the side on which the input device 120 is mounted. The sensor 344 has a field of view facing substantially downwards, away from the support member 304 and towards the ribbon spindle 232 mentioned earlier. The ribbon spindle 232, as will be described in greater detail below, also functions as an encoder wheel, enabling the controller 106 to monitor dispensing of the ribbon via detection of rotation of the spindle 232 by the sensor 344. In particular, the spindle 232 includes a set of teeth 348, e.g., extending from a perimeter thereof, whose passage through the field of view of the sensor 344 can be detected and used to measure the speed of rotation of the spindle 232, the number of rotations completed by the spindle 232, or the like.

As will now be apparent, the input assembly 300 may enable assembly of the apparatus 100 to be simplified. For example, rather than affixing a separate mounting plate carrying the support member 304 and input device 120 to the cover 108, the input assembly 300 can be snapped onto the cross-bar 244, before placement of the cover 108 and in fact without manipulation of the cover 108. Routing a cable along the path 340 may also be simplified, as the cover 108 can be left off and the channel 336 is readily accessible to an operator assembling the apparatus 100. Further, integration of the sensor 344 with the input assembly 300 avoids the need to perform additional assembly steps (with additional parts, such as another PCB supporting the sensor 344) to provide ribbon status sensing capabilities to the apparatus 100.

Figure 4:
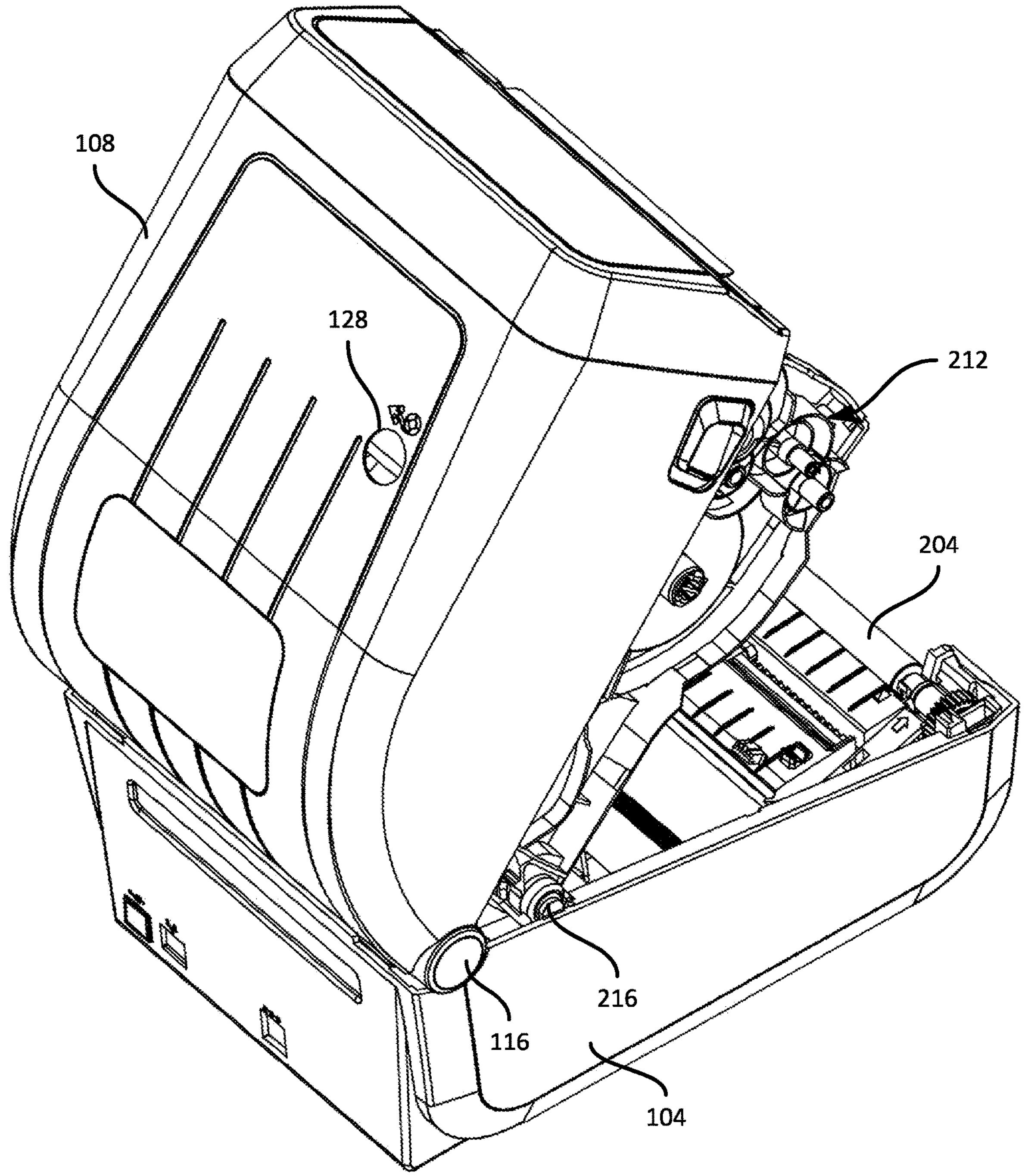
FIG. 4 is a diagram of the media processing apparatus of FIG. 1, in an open position.

Turning to FIG. 4, the apparatus 100 is shown with the cover 108 and the frame 212 in the open position, enabling access to the interior of the apparatus 100, e.g., to replace the media, ribbon, or the like. As seen in FIG. 4, because the frame 212 and the cover 108 rotate along different arcs about the hinges 116 and 216, respectively, the opening 128 is no longer aligned with the input device 120 in the open position. Rather, the input device 120 is inside the cover 108, until the cover 108 is closed.

Figure 5:
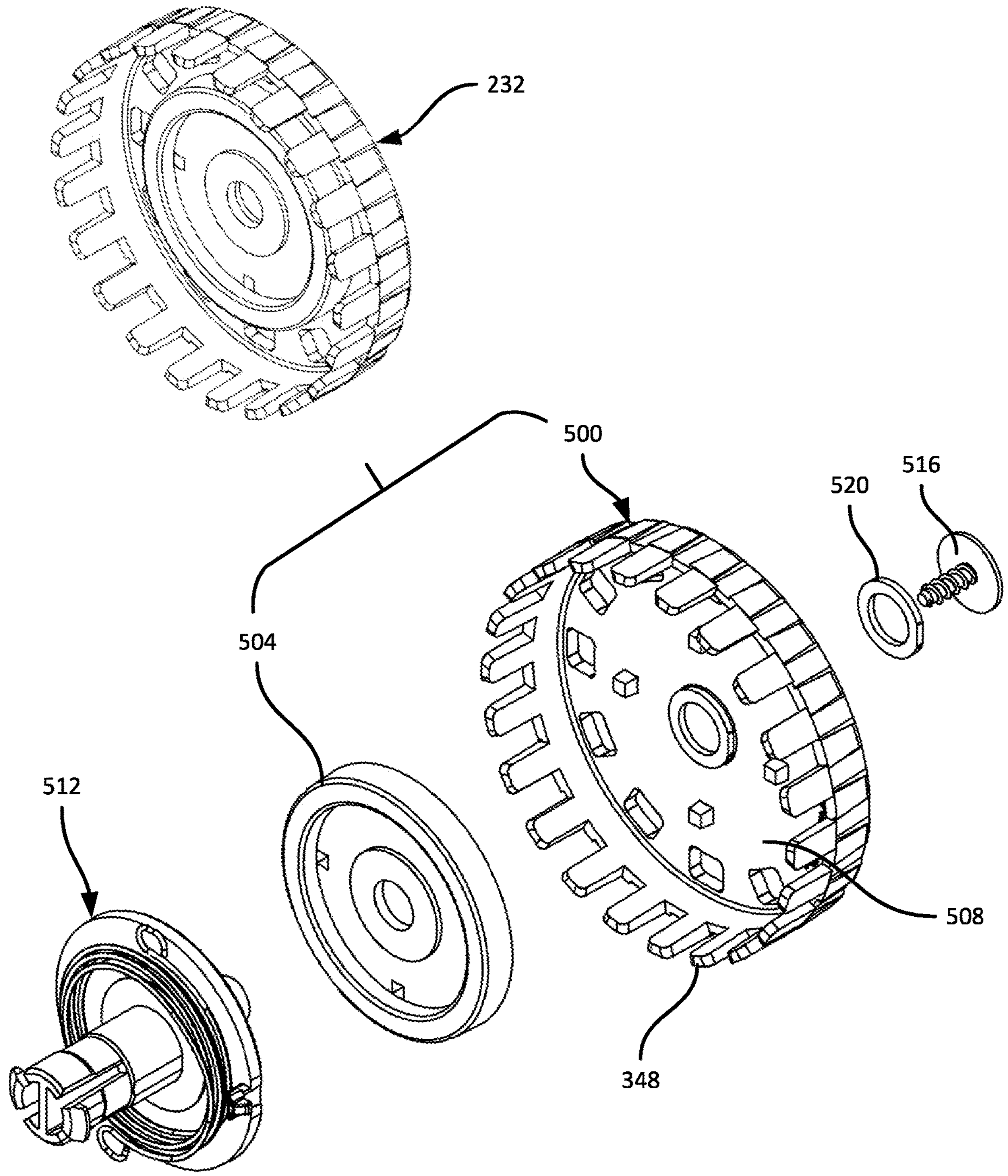
FIG. 5 is an exploded diagram of a ribbon spindle of the media processing apparatus of FIG. 1, viewed from an outer side.

Turning to FIG. 5, the spindle 232 is shown in greater detail. Specifically, the spindle 232 includes a body 500, and a friction member 504 in the form a disc, in this example. The body 500 includes the previously mentioned teeth 348, extending outwards from an outer side 508 of the body 500. The friction member 504 is affixed to the outer side 508, and is configured to engage with a tension setting mechanism 512 of the apparatus 100. The mechanism 512 can include, for example, a disk with a bias member (e.g., a coil spring in the illustrated embodiment) biasing the disk inwards, towards the spindle 232. As a result, the mechanism 512 exerts inward pressure on the spindle 232. Because the mechanism 512 does not rotate, friction results between the mechanism 512 and the friction member 504, which in turn sets a level of tension in a web of ribbon dispensed from a spool supported on an inner side of the spindle 232, opposite the outer side 508 shown in FIG. 5. The friction member 504 can be fabricated from a different material than the body 500, such as a harder and/or more wear-resistant plastic than the body 500. The friction member 504 can thus be enabled to resist wear, while the cost of the spindle 232 as a whole may be controlled by using a less wear-resistant (and potentially less costly) material for the body 500. In some examples, the body 500 and the friction member 504 are fabricated via a two-shot molding process.

The mechanism 512 is supported by the frame, and provides an axis on which the spindle 232 rotates. The spindle 232 can be coupled to the mechanism 512 via a fastener 516, e.g., in combination with a washer 520.

Figure 6:
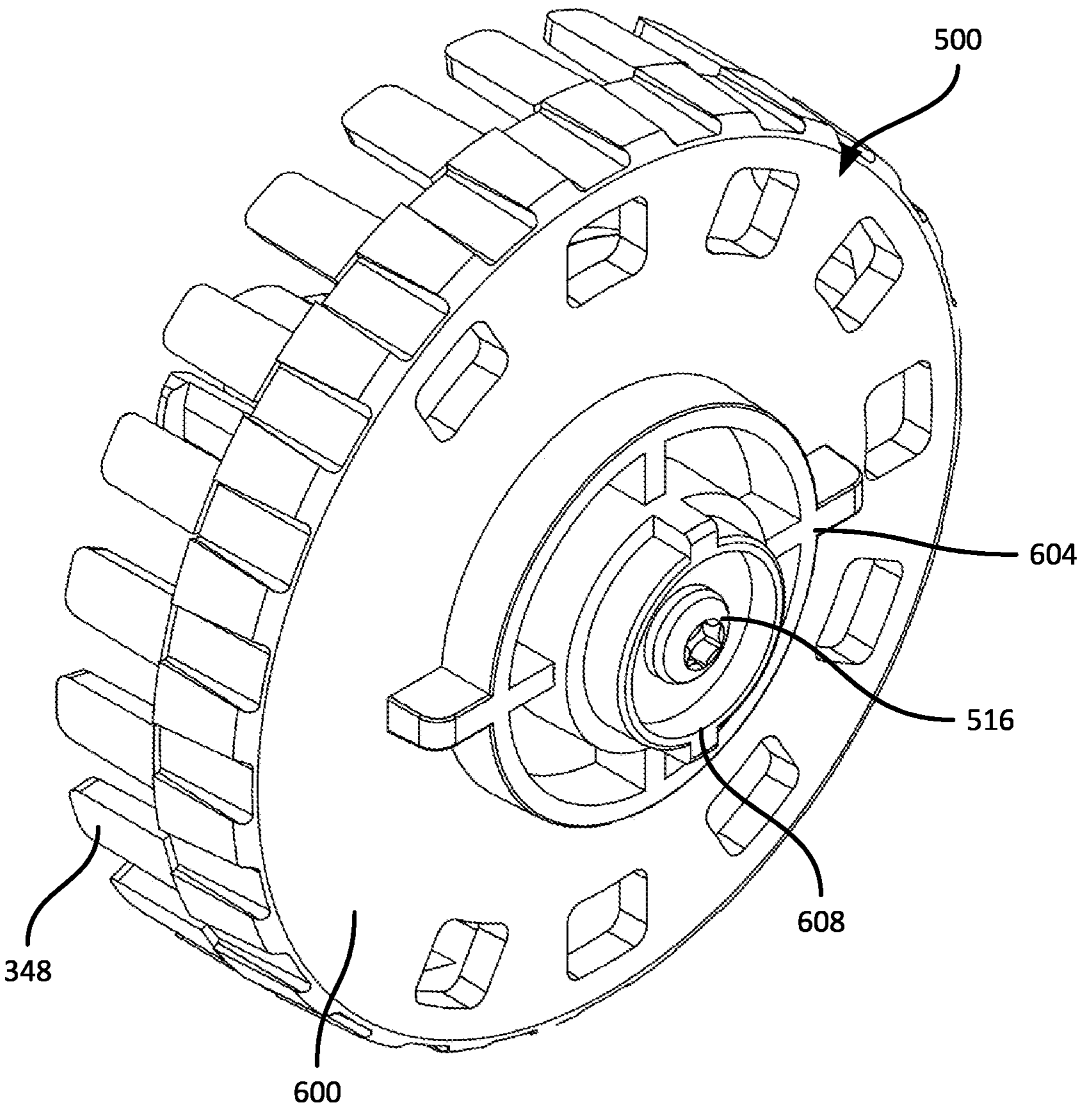
FIG. 6 is a diagram of the ribbon spindle of FIG. 5, viewed from an inner side.

Turning to FIG. 6, an inner side 600 of the spindle 232 is shown, opposite the outer side 508 shown in FIG. 5. The spindle 232 includes, as shown in FIG. 6, a first hub 604 extending inwards from the inner side 600. The hub 604 is configured to support a ribbon supply of a first type, e.g., a roll of ribbon containing a first length of ribbon (and therefore a particular diameter resulting from such length). The spindle 232 also includes a second hub 608 in this example, extending inwards from the first hub 604. The second hub 608 is configured to support a ribbon supply of a second type, e.g., a roll of ribbon containing a second length of ribbon that is smaller than the first length. The spindle 232, in other words, may be compatible with at least two distinct types of ribbon supply.

Implementation of the spindle 232 therefore enables further simplification of the manufacture and/or assembly of the apparatus 100. In particular, providing a single spindle compatible with distinct ribbon supply types mitigates the need to swap spindles to accommodate ribbon supplies. The use of distinct materials for the body 500 and friction member 504 further reduce the manufacturing cost of the spindle 232.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing apparatus, comprising:

a base defining (i) a chamber configured to receive a media supply, and (ii) a lower portion of a media outlet;

a ribbon positioning assembly coupled to the base, the ribbon positioning assembly configured to support a print head at an upper portion of the media outlet;

an input assembly affixed to the ribbon positioning assembly, the input assembly including an input device activatable to generate a signal to a controller of the media processing apparatus;

a lid coupled to the base, and movable relative to the base between (i) a closed position to enclose the chamber and the ribbon positioning assembly, and (ii) an open position to expose the chamber for access from an exterior of the media processing apparatus; the lid including an opening configured to align with the input device when the lid is in the closed position;

a support member affixed to the ribbon positioning assembly, the support member having an upper surface carrying the input device; and a connector mounted on the support member and electrically coupled with the input device, wherein the connector is configured to engage with a signal conduit connected to the controller.

2. The media processing apparatus of claim 1, wherein the ribbon positioning assembly is movable relative to the base between open and closed positions; and wherein the ribbon positioning assembly is configured to support the print head at the upper portion of the media outlet in the closed position.

3. The media processing apparatus of claim 1, wherein the input device is selected from the group consisting of: a button, a touch input, a dial, a switch.

4. The media processing apparatus of claim 1, wherein the ribbon positioning assembly includes a retaining member to affix the support member to the ribbon positioning assembly.

5. The media processing apparatus of claim 1, wherein the connector is mounted on the upper surface of the support member.

6. The media processing apparatus of claim 1, wherein the ribbon positioning assembly includes a channel adjacent to the support member, to carry the signal conduit.

7. The media processing apparatus of claim 1, wherein the input assembly includes a sensor mounted to a lower surface of the support member, opposite the upper surface.

8. The media processing apparatus of claim 7, further comprising a spindle rotatably coupled to the ribbon positioning assembly, to support a ribbon supply; and wherein the sensor is configured to detect rotation of the spindle.

9. The media processing apparatus of claim 8, wherein the spindle includes an encoder wheel; and wherein the sensor includes an optical sensor with a field of view encompassing a portion of the encoder wheel.

10. The media processing apparatus of claim 9, wherein the spindle includes (i) a first hub extending from an inner side of the encoder wheel, configured to support a first type of ribbon supply, and (ii) a second hub extending from the first hub, configured to support a second type of ribbon supply.

11. The media processing apparatus of claim 10, wherein the spindle includes a body defining the first and second hubs, and a friction disc on an outer side of the body.

12. The media processing apparatus of claim 11, wherein the body is fabricated from a first material, and the friction disc is fabricated from a second material.

13. An input assembly for a media processing apparatus, the input assembly comprising:

a support member having an upper surface and a lower surface;

an input device mounted on the upper surface and configured to align with an opening in a lid of the media processing apparatus;

an optical sensor mounted on the lower surface and configured to detect rotation of an encoder wheel of the media processing apparatus; and a connector mounted on one of the upper surface and the lower surface, the connector being electrically coupled with each of the input device and the optical sensor.

14. The input assembly of claim 13, further comprising: a light emitter mounted on the upper surface adjacent to the input device.

15. The input assembly of claim 14, wherein the input device includes a translucent button, and wherein the light emitter is configured to illuminate the button.

* * * * *